US009792551B1

(12) United States Patent
Lu et al.

(10) Patent No.: US 9,792,551 B1
(45) Date of Patent: Oct. 17, 2017

(54) MULTI-SCALE INFORMATION DYNAMICS FOR DECISION MAKING

(71) Applicant: HRL Laboratories, LLC, Malibu, CA (US)

(72) Inventors: Tsai-Ching Lu, Wynnewood, PA (US); David L. Allen, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 407 days.

(21) Appl. No.: 13/933,830

(22) Filed: Jul. 2, 2013

Related U.S. Application Data

(60) Provisional application No. 61/784,365, filed on Mar. 14, 2013.

(51) Int. Cl.
*G06N 99/00* (2010.01)
*G06N 5/04* (2006.01)
(52) U.S. Cl.
CPC ............. *G06N 5/04* (2013.01); *G06N 99/005* (2013.01)
(58) Field of Classification Search
CPC .................................................... G06N 99/005
See application file for complete search history.

(56) References Cited

PUBLICATIONS

A. Srivastav et al. "An information theoretic measure for anomaly detection in complex dynamical systems", Mech. Syst. and Signal Proc., vol. 23, 2009, pp. 358-371.*

K. Viswanathan et al., "Ranking Anomalies in Data Centers", Proc. IEEE Netw. Oper. and Management Symp., 2012, pp. 79-87.*
A.C. Kokaram et al., "Interpolation of missing data in image sequences", IEEE Trans. on Image Proc., vol. 4, No. 11, Nov. 1995, pp. 1509-1519.*
J.L. King and E. Schrems, "Cost-Benefit analysis in information systems development and operation", ACM Computing Surveys, vol. 10, Is. 1, Mar. 1978, pp. 19-34.*
Amigo, J.M., Zambrano, S., Sanjuan, M.A.F., "Permutation Complexity of Spatiotemporal Dynamics", EPL, 90, 10007, 2010, pp. 10007-p1-10007-p5.
Ayton, G.S., Noid, W.G., and Voth, G.A., "Systematic Coarse Graining of Biomolecular and Soft-Matter Systems", MRS Bulletin, 32, 2007, pp. 929-934.
Bandt, C. and Pompe, B., "Permutation Entropy: A Natural Complexity Measure for Time Series", Phys. Rev. Lett., 88, 174102, 2002, pp. 174102-1-174102-4.

(Continued)

*Primary Examiner* — Vincent Gonzales
(74) *Attorney, Agent, or Firm* — Tope-McKay & Associates

(57) ABSTRACT

Described is a system and method for automated discovery of unknown patterns from multiple heterogeneous datasets in support of decision making. The system processes input data with a coarse-graining module to generate multi-scale symbolic representations of the input data having various levels of granularity. If the input data contains missing data, then values are computed for the missing data with an effective information transfer module. The multi-scale symbolic representations are sent to a local information dynamics module and a non-myopic value of information module. Previously unknown patterns in the multi-scale symbolic representations are discovered and extracted with the local information dynamics module. The previously unknown patterns and the multi-scale symbolic representations of the input data are analyzed, and the value of acquiring new input data is ranked with the non-myopic value of information module.

22 Claims, 10 Drawing Sheets

(56) References Cited

PUBLICATIONS

J.P. Crutchfield and M. Mitchell, "The evolution of emergent computation," in Proceedings of the National Academy of Sciences, 1995, pp. 10742-10746.

Q. Hou, L. Wang, N.Y. Lu, B. Jiang, and J.H. Lu, "A FDD method by combining transfer entropy and signed digraph and its application to air separation unit," in International Conference on Control, Automation, Robotics, and Vision, 2010, pp. 352-357.

J.T. Lizier, M. Prokopenko, and A.Y. Zomaya, "Local information transfer as a spatiotemporal filter for complex systems,"Phys. Rev. E, 2008, pp. 026110-1-026110-11.

J.T. Lizier, "The local information dynamics of distributed computation in complex systems," Ph.D. thesis, University of Sidney, 2010, Chapter 4, pp. 83-124.

J.T. Lizier, S. Pritam, M. Prokopenko, "Information dynamics in small-world Boolean networks," in Artificial Life, 2011, pp. 293-314.

Lu, T.C., Przytula, K.W., "Focusing Strategies for Multiple Fault Diagnosis", FLAIRS, 2006, pp. 842-847.

Martini, M., Kranz, T.A., Wagner, T., Lehnertz, K., "Inferring Directional Interactions from Transient Signals with Symbolic Transfer Entropy", Phys. Rev. E, 83, 011919, 2011, pp. 011919-1-011919-6.

J.M. Nichols, M. Seaver, S.T. Trickey, and D.L. Pecora, "Using the transfer entropy to detect structural damage," in IMAC-XXIV Conference and Exposition on Structural Dynamics, 2006, pp. 1-6.

A. Nural, S. Nittel, N. Trigoni, and N. Pettigrew, "A model for motion pattern discovery in ocean drifter networks," in Conference on Coastal Environmental Sensing Networks, 2007, pp. 1-3.

T. Schreiber, "Measuring Information Transfer," in Phys. Rev. Lett., 2000, pp. 461-464.

C.R. Shalizi and J.P. Crutchfield, "Computational Mechanics: Pattern and Prediction, Structure and Simplicity," in Journal of Statistical Physics 104, 2001, pp. 817 - 879.

Staniek, M., Lehnertz, L., "Symbolic Transfer Entropy", Phys. Rev. Lett., 100, 158101, 2008, pp. 158101-1-158101-4.

Zunino, L., Soriano, M.C., Fischer, I., Rosson, O.A., Mirasso, C.R., "Permutation-information-theory Approach to Unveil Delay Dynamics from Time-Series Analysis", Phys. Rev. E, 82, 046212, 2010, pp. 046212-1-046212-9.

Dawid, A. P., "Conditional Independence in Statistical Theory", Journal of the Royal Statistical Society Series B 41 (1): 1-31, 1979, pp. 1-31.

Donders, A.R., van der Heijden, G.J., Stijnen, T, Moons, K.G., "Review: A Gentle Introduction to Imputation of Missing Values", Journal of Clinical Epidemiology, 59(10):1087-1091, 2006, pp. 1087-1091.

\* cited by examiner

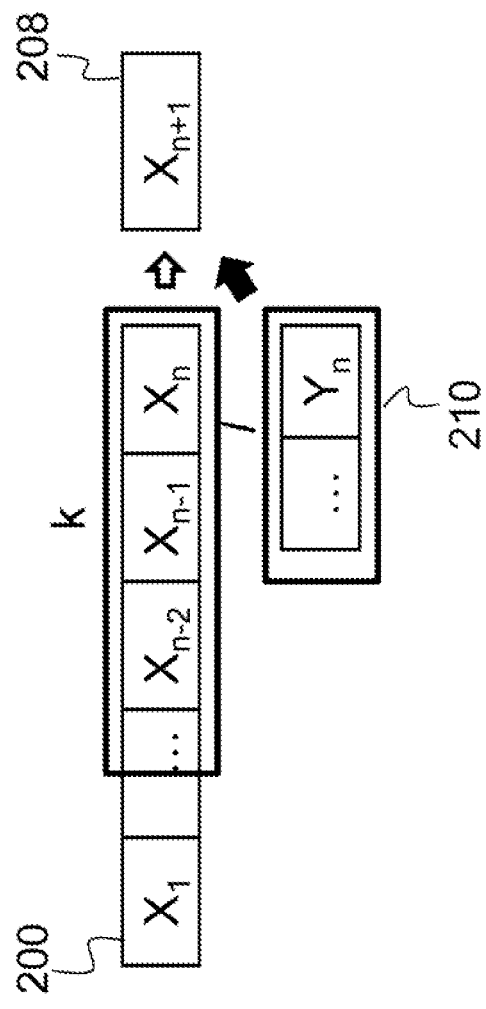
FIG. 2C  Local Transfer Entropy

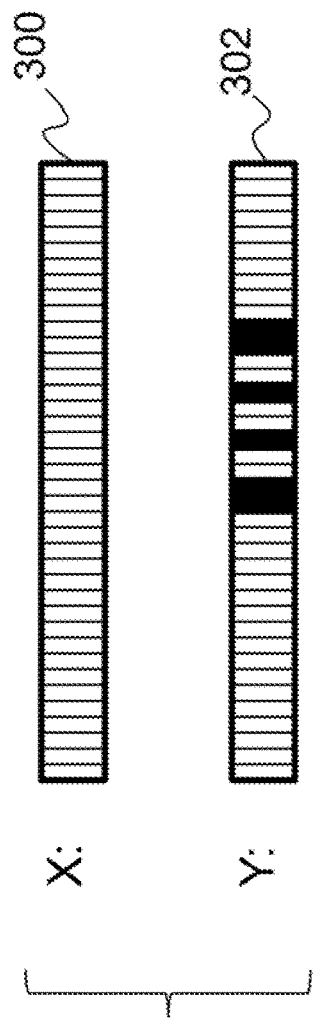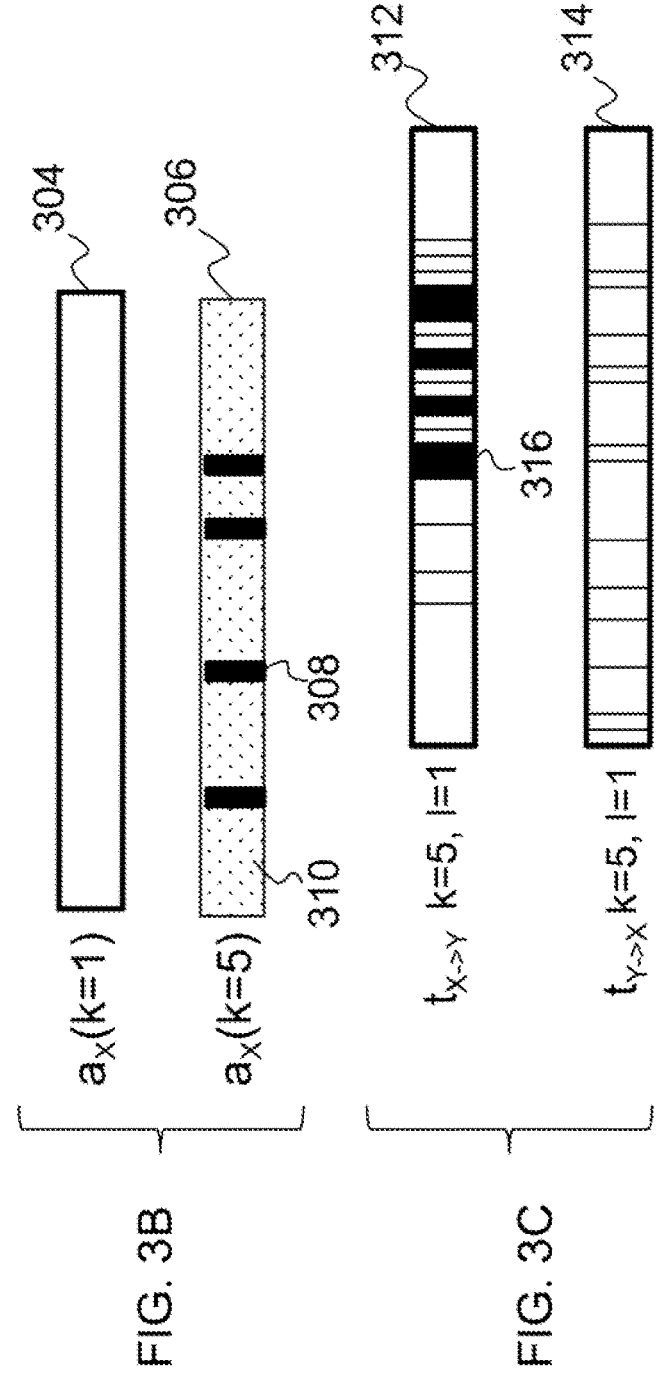
FIG. 3A  FIG. 3B  FIG. 3C

Local Transfer Entropy (one step right)

A — 322
B — 324

Spatiotemporal Data variables — 318
time
320

MULTI-SCALE INFORMATION DYNAMICS FOR DECISION MAKING

CROSS-REFERENCE TO RELATED APPLICATIONS

This is a Non-Provisional patent application of U.S. Provisional Application No. 61/784,365, filed in the United States on Mar. 14, 2013, entitled, "Multi-Scale Information Dynamics for Decision Making."

BACKGROUND OF THE INVENTION (1) Field of Invention

The present invention relates to a system for discovering unknown patterns from data of multiple scales and, more particularly, to a system for discovering unknown patterns from data of multiple scales by combining information dynamics, value of information, and multi-scale analysis.

(2) Description of Related Art

Autonomous information-processing systems have recently become practical and feasible in many application domains due to the increased ability to collect large quantities of data from a variety of different sensors, the significant growth in computational resources available, and improved analysis algorithms. Current techniques, such as matched and specific filters, have significant limitations including: 1) being domain specific; 2) assuming homogeneous data, sensors, and granularity; 3) being limited in the ability to handle uncertain, imprecise, incomplete, missing, or contradictory data; and 4) requiring a priori knowledge of features or patterns of interest.

Information dynamics is rooted in information theory, has a well-established theoretically sound foundation, and explicitly models uncertain, incomplete, and imprecise data. Information dynamics extends information theory to compute local measures of information storage, transfer, and modification, rather than the standard global (averaged) measures typically used. In the field of information dynamics, Schreiber (see the List of Cited Literature References, Literature Reference No. 13) proposed transfer entropy as an information theoretic measure to overcome the limitations of the traditional metric of mutual information. Transfer entropy enables distinguishing between shared information and information as a result of common histories; thus, directional information flows are identified. Additionally, Lizier (see Literature Reference No. 7) developed a framework for local information dynamics consisting of various information theoretic measures, including transfer entropy. However, Lizier (see Literature Reference No. 7) does not have any framework for handling incomplete and missing data or for identification of patterns at multiple scales. Further, Bandt and Pompe (see Literature Reference No. 3) proposed permutation entropy to compare the neighboring points of data to arrive at a symbol sequence of time series without any modeling assumptions. Permutation entropy is fast, robust, and invariant to nonlinear monotonous transformations. Staniek and Lehnertz (see Literature Reference No. 15) proposed that symbolic transfer entropy essentially computes transfer entropy over transformed symbolic time series.

Each of the prior methods described above exhibit limitations that make them incomplete. The invention described herein extends the concepts of permutation entropy and symbolic transfer entropy and uses these concepts under the framework of information dynamics. The present invention combines information dynamics, value of information, and multi-scale analysis to discover unknown patterns from data of multiple scales to support automated decision making.

SUMMARY OF THE INVENTION

The present invention relates to a system for discovering unknown patterns from data of multiple scales and, more particularly, to a system for discovering unknown patterns from data of multiple scales by combining information dynamics, value of information, and multi-scale analysis. The system comprises one or more processors and a memory having instructions such that when the instructions are executed, the one or more processors perform multiple operations. Input data is processed with a coarse-graining module to generate multi-scale symbolic representations of the input data having various levels of granularity. The multi-scale symbolic representations are sent to a local information dynamics module and a non-myopic value of information module. Previously unknown patterns in the multi-scale symbolic representations are discovered and extracted with the local information dynamics module. The previously unknown patterns and the multi-scale symbolic representations of the input data are analyzed, and the value of acquiring new input data is ranked with the non-myopic value of information module.

In another aspect, if the input data contains missing data, then values for the missing data are computed with an effective information transfer module.

In another aspect, the previously unknown patterns are utilized as at least one of input to the effective information transfer module to improve future missing data computations and input to the non-myopic value of information module.

In another aspect, with the coarse-graining module, an embedding dimension parameter and a time-delay parameter are adjusted to extract data points from the input data in order to generate the multi-scale symbolic representations.

In another aspect, at least one of a local transfer entropy measure and a local action information storage measure are used to discover and extract the previously unknown patterns with the local information dynamics module.

In another aspect, missing data is substituted with estimated values with the effective information transfer module, wherein effective information transfer is used to compute the estimated values.

In another aspect, transfer entropy is used as a quasi-utility value function. An expected value of observing new input data is computed, and expected benefits of observing new input data are computed. A value of information of observing new input data is computed, wherein the value of information is computed by weighting the expected benefit of observing new input data against a cost of observing the new input data.

As can be appreciated by one skilled in the art, the present invention also comprises a method for causing a processor to perform the operations described herein.

Finally, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2C illustrates local transfer entropy according to principles of the present invention;

FIG. 3A is an illustration of two discrete variables, X and Y, according to principles of the present invention;

FIG. 3B is an illustration of active information storage for variable X using two different history lengths according to principles of the present invention;

FIG. 3C is an illustration of local transfer entropy between variables X and Y according to principles of the present invention;

DETAILED DESCRIPTION

Figure 1:
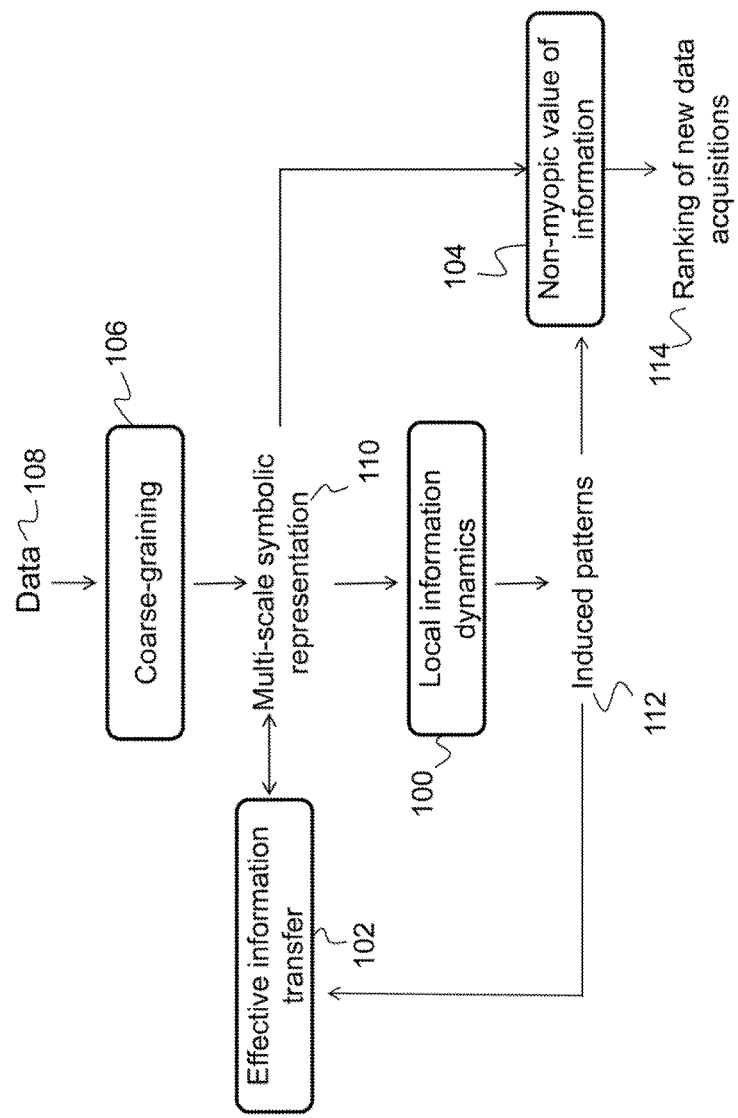
FIG. 1 is a flow diagram of a multi-scale information dynamics system according to principles of the present invention.

The present invention relates to a system for discovering unknown patterns from data of multiple scales and, more particularly, to a system for discovering unknown patterns from data of multiple scales by combining information dynamics, value of information, and multi-scale analysis. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Amigo, J. M., Zambrano, S., Sanjuan, M. A. F., "Permutation Complexity of Spatiotemporal Dynamics", EPL, 90, 10007, 2010.
2. Ayton, G. S., Noid, W. G., and Voth, G. A., "Systematic Coarse Graining of Biomolecular and Soft-Matter Systems", MRS Bulletin, 32, 2007.
3. Bandt, C. and Pompe, B., "Permutation Entropy: A Natural Complexity Measure for Time Series", Phys. Rev. Lett., 88, 174102, 2002.
4. J. P. Crutchfield and M. Mitchell, "The evolution of emergent computation," in Proceedings of the National Academy of Sciences, 1995.
5. Q. Hou, L. Wang, N. Y. Lu, B. Jiang, and J. H. Lu, "A FDD method by combining transfer entropy and signed digraph and its application to air separation unit," in International Conference on Control, Automation, Robotics, and Vision, 2010.
6. J. T. Lizier, M. Prokopenko, and A. Y. Zomaya, "Local information transfer as a spatiotemporal filter for complex systems," Phys. Rev. E, 2008.
7. J. T. Lizier, "The local information dynamics of distributed computation in complex systems," Ph.D. thesis, University of Sidney, 2010.
8. J. T. Lizier, S. Pritam, M. Prokopenko, "Information dynamics in small-world Boolean networks," in Artificial Life, 2011.
9. Lu, T. C., Przytula, K. W., "Focusing Strategies for Multiple Fault Diagnosis", FLAIRS, 2006.
10. Martini, M., Kranz, T. A., Wagner, T., Lehnertz, K., "Inferring Directional Interactions from Transient Signals with Symbolic Transfer Entropy", Phys. Rev. E, 83, 011919, 2011.

11 J. M. Nichols, M. Seaver, S. T. Trickey, and D. L. Pecora, "Using the transfer entropy to detect structural damage," in IMAC-XXIV Conference and Exposition on Structural Dynamics, 2006.

12. A. Nural, S. Nittel, N. Trigoni, and N. Pettigrew, "A model for motion pattern discovery in ocean drifter networks," in Conference on Coastal Environmental Sensing Networks, 2007.

13. T. Schreiber, "Measuring Information Transfer," in Phys. Rev. Lett., 2000.

14. C. R. Shalizi and J. P. Crutchfield, "Computational Mechanics: Pattern and Prediction, Structure and Simplicity," in Journal of Statistical Physics 104, 2001.

15. Staniek, M., Lehnertz, L., "Symbolic Transfer Entropy", Phys. Rev. Lett., 100, 158101, 2008.

16. Zunino, L., Soriano, M. C., Fischer, I., Rosson, O. A., Mirasso, C. R., "Permutation-information-theory Approach to Unveil Delay Dynamics from Time-Series Analysis", Phys. Rev. E, 82, 046212, 2010.

17. Donders, A. R., van der Heijden, G. J., Stijnen, T, Moons, K. G., "Review: A Gentle Introduction to Imputation of Missing Values", Journal of Clinical Epidemiology, 59(10):1087-1091, 2006.

18. Dawid, A. P., "Conditional Independence in Statistical Theory", Journal of the Royal Statistical Society Series B 41 (1): 1-31, 1979.

(2) Principal Aspects

The present invention has three "principal" aspects. The first is a system for discovering unknown patterns from data of multiple scales. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for discovering unknown patterns from data of multiple scales. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details

The present invention is a system and method for automated discovery of unknown patterns from multiple heterogeneous datasets in support of automated decision making. Autonomous information-processing systems have recently become practical and feasible in many application domains due to the increased ability to collect large quantities of data from a variety of different sensors, the significant growth in computational resources available, and improved analysis algorithms. Applications for the invention described herein include, but are not limited to, cybersecurity, navigation, robotics, and system health management. The successful deployment of the technology will result in improving rapid, accurate decision making and improving pervasive and persistent surveillance.

As depicted in FIG. 1, the present invention comprises four technical modules: a local information dynamics module 100, an effective information transfer module 102, a non-myopic value of information module 104, and a coarse-graining module 106. As data 108 (e.g., spatiotemporal data such as network signals, social media signals, and electronic radio frequency (RF) signals) enters the system, the coarse-graining module 106 analyzes the data 108 to compute various levels of granularity (i.e., the extent to which a system is broken down into small parts) using multi-scale symbolic transfer entropy to generate a multi-scale symbolic representation 110.

If the data 108 contains missing data, then the system leverages the effective information transfer module 102 to determine appropriate values for the missing data. The results of the effective information transfer module 102 are then fed to both the local information dynamics module 100 and the non-myopic value of information module 104. The local information dynamics module 100 discovers previously unknown patterns (i.e., induced patterns 112), which can then be used 1) by other decision support modules; 2) to improve future missing data computations in the effective information transfer module 102 and 3) as input to the non-myopic value of information module 104. The final module, the non-myopic value of information module 104, takes the multi-scale symbolic representation 110 and the induced patterns 112 and ranks the value of acquiring new data (i.e., ranking of new data acquisitions 114). Each of these modules will be described in further detail below.

(3.1) Information Dynamics Module

Understanding interactions in complex environments, such as how RF signals are jammed, hopped, and tracked, is a significant challenge for autonomous information-processing systems. These interactions may take the form of spatiotemporal patterns or be even less structured, such as in social or complex networks. In many scenarios, system designers or users cannot know all possible patterns of interest a priori; therefore, being able to discover novel patterns in order to leverage them for decision making is a challenging task. Furthermore, these patterns may be occurring across multiple heterogeneous datasets (e.g., patterns in mobility data correlating with patterns in communication data), which contain significant amounts of missing, uncertain, incomplete, and even contradictory data. The invention described herein leverages recent innovations in the area of local information dynamics to address these challenges and provide robust domain independent feature extraction of patterns.

Information dynamics analyzes processes using the notions of information storage, information transfer, and information processing (see Literature Reference No. 7). The present invention utilizes the recent extensions in this area, especially those of transfer entropy and local information dynamics metrics, to discover and extract patterns (i.e., induced patterns 112, FIG. 1), which can then be used to fill in missing data, rank value of acquiring new data (i.e., ranking of new data acquisitions 114, FIG. 1), and also provide inputs to automated decision algorithms and automated data collection algorithms disclosed in the present invention.

The aforementioned techniques are founded on the theoretically sound and consistent algorithms of information theory. Recently, transfer entropy has begun to be leveraged in applications such as fault detection and diagnosis (see Literature Reference No. 5) and detection of structural damage (see Literature Reference No. 11); however, the broader concepts of information dynamics and local information metrics have not made the transition from theoretical simulations (e.g., in elementary cellular automata) to real world implementations despite their ability to discover unknown patterns in spatiotemporal environments as well as in relational network environments.

Figure 2A:
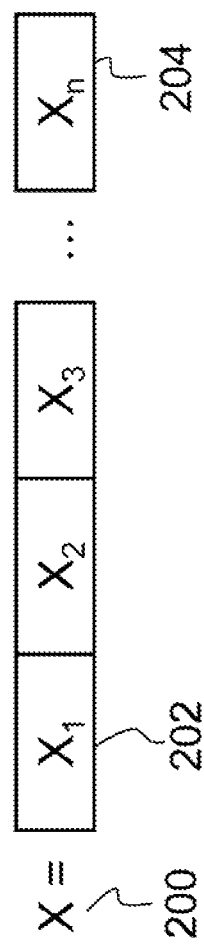
FIG. 2A illustrates evolution of a single variable over time according to principles of the present invention.
Figure 2B:
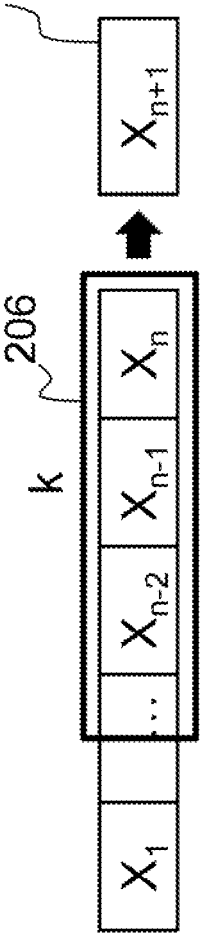
FIG. 2B illustrates local active information storage according to principles of the present invention.

Information dynamics extracts predictive information from temporal processes and also identifies interactions across multiple processes using a variety of information theory based metrics. FIG. 2A is a diagram depicting the evolution of a single variable X 200 over time (i.e., $X_1$ 202 to some value $X_n$ 204), such as the data stream from a sensor. Two example metrics are local active information storage, as shown in FIG. 2B, and local transfer entropy, as shown in FIG. 2C. A key feature of these metrics (or measures) is that they are able to characterize local properties (both temporally and spatially) of the processes and their interactions as they evolve in time.

As illustrated in FIG. 2B, local active information storage is a measure of how informative the history (of length k 206) of a variable is at predicting its next value (e.g., $X_{n+1}$ 208). Local transfer entropy, illustrated in FIG. 2C, quantifies directional influences between processes (e.g., between a variable X 200 and a variable Y 210). In other words, how does variable Y 210 affect the next value of variable X 200 in time, $X_{n+1}$ 208? Local information storage and local transfer entropy are described in detail in Literature Reference No. 6.

In FIG. 3A, two discrete variables are depicted in a variable X diagram 300 and a variable Y diagram 302. As non-limiting examples, the variables could represent a sensor signal and a control signal of an actuator. In FIG. 3B, the active information storage for variable X using two different history lengths is shown in a k=1 diagram 304 and a k=5 diagram 306. Note that values are measured at each step, demonstrating temporal locality. It can be seen that a history of only 1 state (i.e., k=1 diagram 304) does not store enough information to be a good predictor. This is indicated by the all white k=1 diagram 304. However, a history of the previous 5 states (i.e., k=5 diagram 306) is enough storage to predict with good results, as depicted as dark bands 308 (negative measures) and a pattern 310 (positive measures). In actual results, the various measures are represented in different colors. The process of generating variable X, in actuality, is using the previous three values plus some randomness to create the next value. Thus, the analysis results do correspond with real-world processes.

Transfer entropy was proposed in Literature Reference No. 13 as an information theoretic measure to overcome the limitations of the traditional metric of mutual information. Transfer entropy enables distinguishing between shared information and information as a result of common histories; thus, directional information flows are identified. Lizier (see Literature Reference No. 6) extended transfer entropy to measure local information transfer. FIG. 3C illustrates two temporal processes, process X 312 and process Y 314, which initially are independent processes. Nural (see Literature Reference No. 12) presented a scenario where networks of drifting sensors are used to monitor processes related to ocean currents. In a non-limiting application such as that, process X 312 and process Y 314 of the present invention could be sensors that are initially spatially separated. During the scenario, X begins transferring information to Y, and then eventually they begin working independently again (i.e., in the scenario they may move such that X is monitoring a process which directly influences the local environment of sensor Y and then eventually they separate, or the influence is broken). This interaction is shown in process X 312 of FIG. 3C, where concentrated bands 316 depict the transfer of information from X to Y. Note also that the flow is directional, as there is no corresponding flow from Y to X as would be depicted with mutual information or correlation metrics. The lack of flow from Y to X is depicted in process Y 314, which lacks concentrated bands. Another thing to note is that using the traditional averaged metrics, rather than the local information metrics, would result in simply a single value showing the relationship between X and Y, and the transitive temporal nature of when the interaction begins and ends would not be able to be extracted.

The local active information storage and transfer entropy measures, along with many others (see Literature Reference No. 7), can be used to fuse datasets and detect patterns in various domains and at multiple scales. The datasets can be spatial or have more complex interactions, for example they could be modeled by relational networks with the metrics depicting the strength and influence of the network connections (see Literature Reference No. 8). The approach is also applicable to multiple scales of data. For instance, at the lowest level, the processes could be derived from raw sensor data and multiple datasets could be fused by looking at the information dynamics between the processes. At a higher level, the processes under evaluation could be derived from domain-specific processed sensor data, such as object recognition results from images or videos.

Figure 3E:
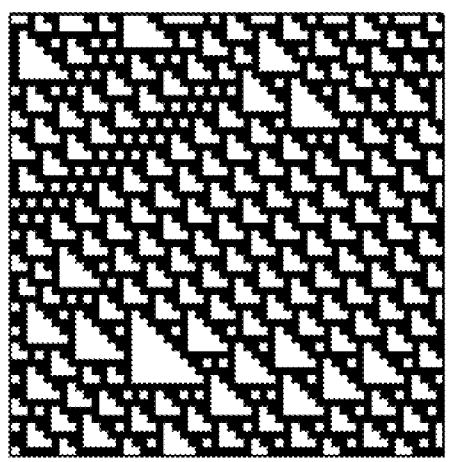
FIG. 3E is an illustration of pattern discovery according to principles of the present invention.
Figure 3D:
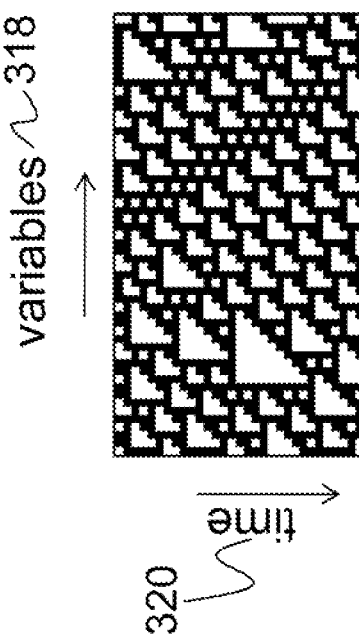
FIG. 3D is an illustration of simulated spatiotemporal data according to principles of the present invention.

FIG. 3D depicts an example of simulated spatiotemporal data, such as may be acquired by an intelligence, surveillance, and reconnaissance (ISR) sensor. The illustration represents a one-dimensional (1D) space in the horizontal direction (i.e., variables 318) which changes over time 320 in the vertical dimension. By quick examination of the data, it is not obvious what patterns are underlying the data. However, if the local transfer entropy of the data is analyzed (FIG. 3E), one can clearly see places where spatial information transfer is occurring. In FIG. 3E, data points (represented by squares) are shown as open or filled to represent data at different time points. If one examines the high transfer entropy area noted with an 'A' 322, one can see that in the raw data, this corresponds with an area where two domains (i.e., filled squares and open squares) of consistent patterns come together. From an analysis and data collection perspective, this is an area of high interest. The domains have consistent patterns, but where they join together there are changes occurring, such as domains growing, moving, or merging. The area noted with a 'B' 324 is a domain which is not as informative, since it consists mostly of a consistent pattern, and the analysis correctly identifies this as a region of low local transfer entropy, since there are few changes occurring. These complex areas can be used to build up particle catalogs of domains, particles, and interactions. These complex areas can be thought of as a high level representation of the raw data (see Literature Reference No. 4) and correspond to features of interest for decision algorithms. More recently, Literature Reference No. 14 used measures of statistical complexity as automatic filters for detecting spatiotemporal structure.

(3.2) Effective Information Transfer Module

Addressing the problems of missing data often starts with characterizing the reasons why data is missing. Conventional Missing Completely at Random (MCAR), Missing at Random (MAR) or Missing Not at Random (MNAR) assumptions have previously been used to address missing values by discarding the entities associated with missing data from analysis. Alternatively, the aforementioned assumptions have been used to substitute missing data with estimates from regression, maximum likelihood estimators (MLE), expected maximization (EM), or multiple imputation (MI) methods (see Literature Reference No. 17). The latter substitution approach is preferred over the former deletion approach in the case of multi-dimensional spatiotemporal data. Nevertheless, incorrect assumptions of missing data mechanisms can introduce inaccuracy, inconsistency, and cumulated error effects.

In the present invention, the effective information transfer metric (ET) is first defined at the global level as ET(Y,X)= $T_{Y->X}-T_{X->Y}$ to discern influence direction between two data sources X and Y, where ET(Y,X)>0 for Y driving X, and ET(Y,X)<0 for X driving Y. $T_{Y->X}$ is the transfer entropy from Y to X; $T_{X->Y}$ is the transfer entropy from X to Y. ET is the difference of transfer entropy. The relative strength of ET(Y,X) for data sources within an application domain can be obtained by normalizing over the observed value ranges of possible pairs of effective information transfer in the application domain. Following local transfer entropy, as described in Literature Reference No. 6, effective information transfer can also be defined as a local metric et(Y,X)= $t_{Y->X}-t_{X->Y}$, which enables one to see the transient influences between two processes.

The global level refers to an average across the whole process. For instance, given two time series X and Y, $T_{Y->X}$ or $T_{X->Y}$ are global in the sense of taking the whole two time series into account, then $T_{Y->X}$ or $T_{X->Y}$ are scale values. $t_{Y->X}$ or $t_{X->Y}$, on the other hand, are time series which are, therefore, local for the specific time point conditioned on the length of time embedding for the process X and Y.

Figure 4:
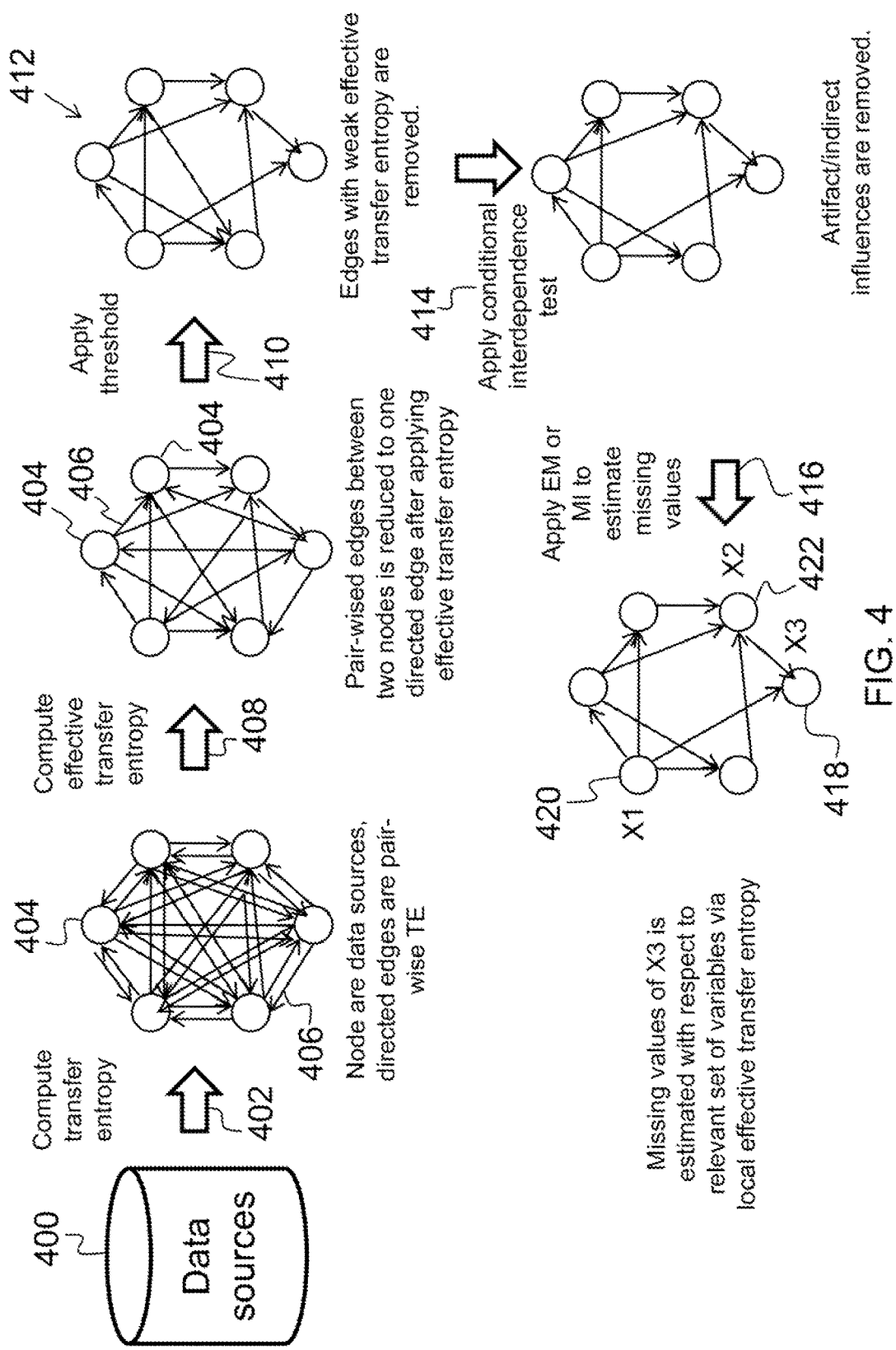
FIG. 4 is an illustration depicting how effective transfer entropy enables robust estimation of missing data according to principles of the present invention.

To address the problem of missing values, the present invention uses effective information transfer to estimate the missing value, similar to Expected -Maximization (EM) and Multiple-Imputation (MI) methods. FIG. 4 illustrates how effective transfer entropy enables robust estimation of missing data. Global effective information transfer is first applied over observed data to discern directional influences among data sources in the application domain. Given a set of observed data sources 400, transfer entropy is computed 402 for all pairs of nodes 404, where nodes 404 represent data sources and directed edges 406 (arrows) represent pair-wise transfer entropy (TE). Next, effective transfer entropy (i.e., effective information transfer) is computed 408. Pair-wised edges between pairs of nodes 404 are reduced to one directed edge 406 after applying effective transfer entropy 408.

By applying a predetermined threshold 410 over the normalized effective information transfer, one can derive the skeleton of directional influence among variables, represented as a directed graph 412, where edges with weak effective transfer entropy are removed. In other words, computed transfer entropy values between pairs of nodes below the predetermined threshold are removed such that only edges with strong transfer entropy remain. A directed graph is a graph, or set of nodes connected by edges, where the edges have a direction associated with them.

Next, conditional independence assumptions encoded in the directed graph 412 are extracted and verified against the data with conditional transfer entropy (i.e., apply conditional interdependence test 414) to check whether derived conditional independence assumptions hold (i.e., $T_{Y->X|Z}=T_{Y->X}$). Conditional independence assumptions encoded in the directed graph are described in Literature Reference No. 18. This step enables differentiation of direct from indirect directional influences. Thus, artifact/indirect influences are removed. Iterations of the conditional interdependence test occur through every non-root node (i.e., every node that has a parent node) in the directed graph to further refine the directional relation among data sources. Finally, for a missing value in X', the local transfer entropy is computed using the set of direct influences (the directed parents of $X'_i$) to estimate the missing value with EM or MI (i.e., apply EM or MI to estimate the missing values 416). The missing value is therefore estimated by transition probability with the most relevant direct influences, as described below. The "direct influence" is the set of parent nodes, Pa(X), of a node X. The missing value is estimated by EM or MI. A missing value of X is estimated as the transition probability, where the past values (probability distribution) of the parent nodes Pa(X) and X are used to estimate the next value of X. For instance, referring to FIG. 4, the missing values of node X3 418 are estimated with respect to a relevant set of variables, X1 420 and X2 422, via local effective transfer entropy. This method is expected to perform better than other methods that estimate missing values without considering localized directional influences.

(3.3) Non-myopic Value of Information Module

The problem of determining the value of acquiring new data is typically addressed by methods in a decision-theoretical framework where the value of new data is weighted by the likelihood of its realization to derive an expected utility. When the value function is hard to obtain, a quasi-utility function, derived from information theory, is used to alleviate the laborious process of utility elicitation. Utility elicitation is often conducted by asking human subjects to perform mental exercises to bet on the outcomes of their decisions by varying the likelihood of the outcomes under different actions. Due to the computational complexity, the value of acquiring new data is usually assessed myopically for one single piece of new data at a time, based on mutual information. Such a myopic approach is less likely to be cost-effective, especially in the case where expensive resources are deployed to carry out new data acquisitions. Moreover, computing the value of information based on mutual information cannot differentiate the value of directional influences, which is critical in supporting the reasoning for the effect of course of actions.

In decision-theoretic framework, the formulation of value of information (VOI) starts with a value function, V, which maps the distribution of hypotheses into a real value: $(P(H|e)):[0:1]^{|H|} \to R$, where H is the hypothesis space, e denotes the observed data points, R denotes real value, P represents probability, the arrow represents mapping, and |H| represents the size or the number of hypotheses. Note that hypotheses are patterns learned from historical data by measures of information dynamics. The expected value (EV) of acquiring new data can be defined as $$EV(D) = \sum_{d \in D} V(P(H|e,d))P(d),$$

where the value of observing new data, d, which is an element of set D, in contribution to hypothesis space H is weighted by the likelihood of its realization P(d). Σ represents a summation. The expected benefit (EB) for observing the new data is expressed as the differences between the expected value of observing the new data and the current value of observed data toward hypotheses as follows: EB(D) =EV(D)−V(P(H|e)). Note that EB(D) can be further normalized as a function of H(H|e,D) and H(H|e), where H() represents an entropy function.

The value function in this formulation is typically a utility function. When a utility function is hard to obtain, a quasi-utility value function can be used (i.e., $$V(P(H \mid e)) \stackrel{def}{=} H(H \mid e) = -\sum_{h \in H} P(h \mid e) \log P(h \mid e)).$$

The expected benefit is reduced to mutual information (D)=H(H|e,D)−H(H|e)=I(H;D|e), where I(H;D|e) is the mutual information (I) between hypothesis space H and the new data D given observed data e. The value of information, VOI, for acquiring a new data with respect to hypotheses can therefore be defined as: VOI(H,D|e)=EB(D)−αC(D), where C(D) is the cost of acquiring the data D, and α is scaling factor to weight between the cost and the expected benefit (see Literature Reference No. 9).

Figure 5:
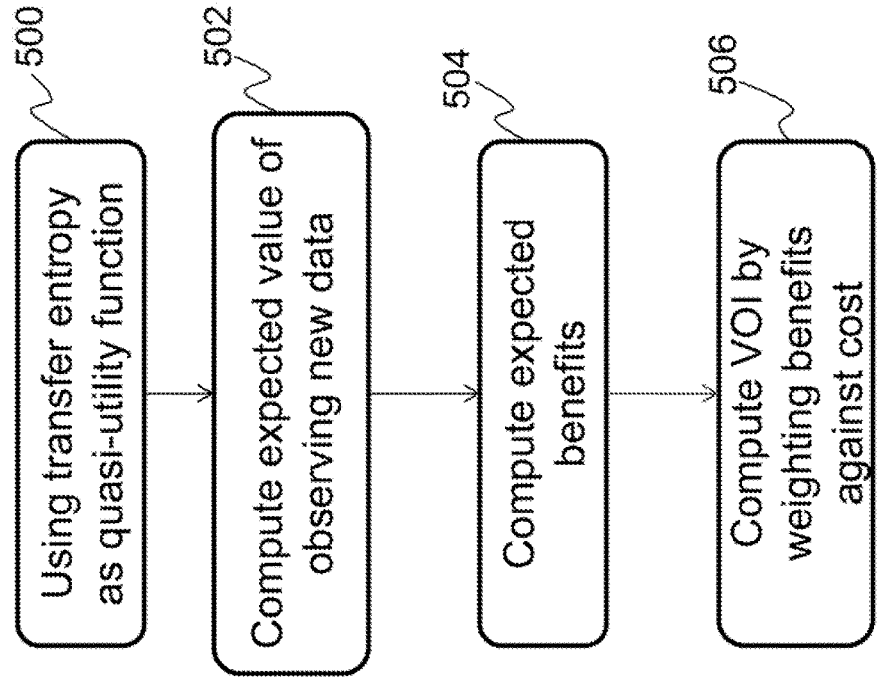
FIG. 5 is an illustration depicting how non-myopic value of information computations enables identification of most beneficial data to acquire according to principles of the present invention.

Built upon conventional decision-theoretic VOI formulation, the present invention describes a non-myopic VOI computation with transfer entropy to rank the expected value of acquiring new data, which is illustrated in FIG. 5. Applying the VOI definition, there is VOI($H_{T+1}, X_{T+1}|X$) for acquiring new data at the next time step or incorporate a new data source VOI($H_{T+1}, X_T^{N+1}|X$) with respect to the next hypothesis space $H_{T+1}$. X is the current data point, and $X_{T+1}$ is the next data point in time. $X_T^{N+1}$ is the new data source at time T. For example, there were N data sources, and now there are N+1 data sources.

FIG. 5 is an illustration depicting how non-myopic value of information (VOI) computations of the present invention enable identification of the most beneficial data to acquire. Each of the equations described below is executed in the non-myopic value of information module (FIG. 1, 104). In order to incorporate directional influences, transfer entropy is used as the quasi-utility value function (i.e., using transfer entropy as quasi-utility function 500) according to the following:

$$V(P(H_{T+1} \mid X)) \stackrel{def}{=} \tag{1}$$

$$TE_{X \to H_{T+1}} = \sum P(h_{T+1}, h_T, x_T) \log \left[ \frac{P(h_{T+1} \mid h_T, x_T)}{P(h_{T+1} \mid h_T)} \right],$$

where $h_{T+1} \in H_{T+1}, h_T \in H_T, x_T \in X_T$.

Following the same formulation, the expected value of observing new data i.e., $X_{T+1}$) is computed (i.e., compute expected value of observing new data 502) according to the following:

$$EV(X_{T+1}) = \sum_{x_{T+1} \in X_{T+1}} V(P(H_{T+1} \mid X, x_{T+1})) P(x_{T+1}) = \tag{2}$$

$$\sum_{x_{T+1} \in X_{T+1}} V(P(H_{T+1} \mid X, x_{T+1})) P(x_{T+1}) =$$

$$\sum_{x_{T+1} \in X_{T+1}} TE_{X_{T+1} \to H_{T+1}} P(x_{T+1})$$

Similarly, the expected benefit (i.e., compute expected benefits 504) will be:

$$EB(X_{T+1}) = EV(X_{T+1}) - V(P(H_{T+1} \mid X)) = \tag{3}$$

$$\sum_{x_{T+1} \in X_{T+1}} TE_{X_{T+1} \to H_{T+1}} P(x_{T+1}) - TE_{X \to H_{T+1}}$$

Therefore, the value of information for observing $X_{T+1}$ (i.e., compute VOI by weighting benefits against cost 506) can be derived as:

$$VOI(H_{T+1}, X_{T+1} \mid X) = EB(X_{T+1}) - \alpha C(X_{T+1}). \tag{4}$$

Similar construction can be formulated for VOI($H_{T+1}, X_i^{N+1}|X$).

In myopic value of information computation, the expected value is computed for either the possible value $X^i_{T+1}$ in set $X_{T+1}$ of the next time step T+1 for data source i or the value $X_i^{N+1}$ of the new data source N+1. Rather than computing VOI for $X_{T+1}$, which can be intractable, the present invention computes non-myopic value of information transfer for the subset $X^S_{T+1}$ of $X_{T+1}$, given the directed influences and conditional independence encoded in the directed graph. Moreover, the present invention ranks over the non-myopic value of information transfer of all subsets of $X^S_{T+1}$ to further down-select (i.e., narrow the field of choices) the most valuable data to collect. Such ranking enables one to weight the expected value against the cost functions, rather than simply collect new data for $X^S_{T+1}$. For instance, a decision maker needs to know if the new data is worth acquiring or not. As a non-limiting example, one may need to send out an unmanned aerial vehicle (UAV) to collect more data which could be costly. However, if the benefit of acquiring the new data outweighs the cost, the decision maker will decide to make such an acquisition.

(3.4) Course-Graining Module

The coarse-graining module (FIG. 1, 106) enables co-utilization of datasets with widely different granularities. While a coarse measurement may miss the details, a fine-grained measurement may overwhelm the user with a mountain of data that hinders the discovery of hidden patterns. The challenge is to acquire data with proper granularity, given limited resources and/or specific missions, and simultaneously overcome missing and incomplete data by processing data at the proper granularity.

In one aspect, the coarse-graining techniques can be embedded within the value of information techniques. Alternatively, the course-graining techniques may he leveraged to support other decision modules. This enables data acquisition and processing across granularity levels to allow transient hidden patterns to he revealed as well as assisting with reasoning with partial observability.

Coarse-graining is typically used as a data filtering technique to derive a coarse-grained representation as an input to decision analysis algorithms. Systematic multi-scale coarse-graining has been studied for integrating information from various datasets at different scales (see Literature Reference No. 2). Coarse-graining techniques apply a mapping function/operator to transform data from one resolution to another. The mapping function is usually designed to preserve the information in the data and to make coarse-grained information readily accessible for analysis algorithms. Although such techniques have shown some promising results in statistical mechanics and other fields, the focus of the present invention is investigating coarse-graining techniques under the framework of information dynamics to provide informative multi-scale representation for underling dynamics. Moreover, the invention described herein integrates coarse -graining with value of information to acquire new data at proper granularity. This concept not only goes beyond the conventional data filtering application of coarse-graining, but also provides the benefit of maximizing the resources available for new data acquisitions.

Figure 6:
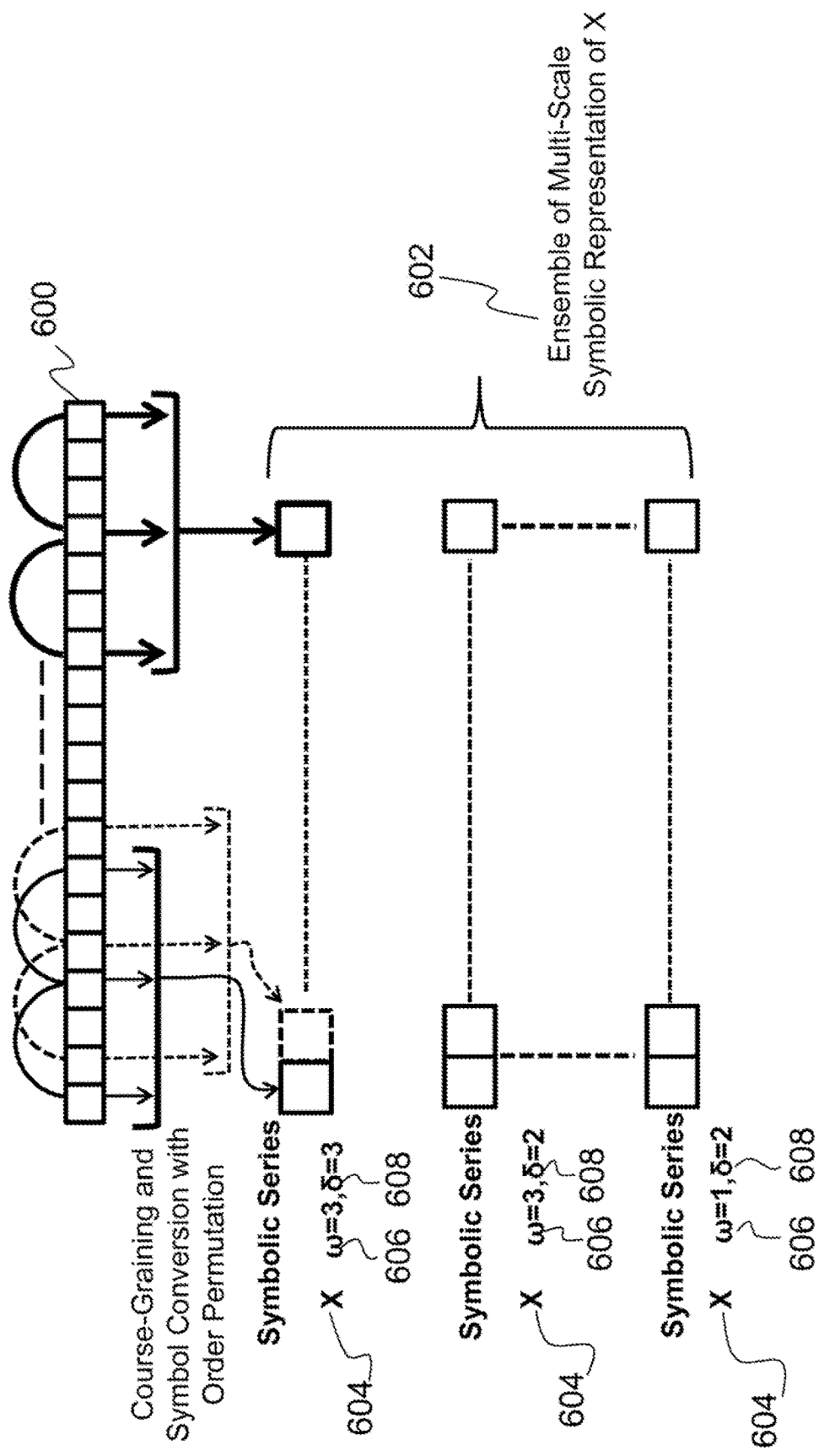
FIG. 6 is an illustration of course-graining of data according to principles of the present invention.

To address challenges in coarse graining, the present invention comprises a multi-scale symbolic transfer entropy method to automatically identify the appropriate spatiotemporal embedding dimensions for data acquisitions and processing. FIG. 6 is an illustration of coarse graining data. An original spatio -temporal series X 600 (e.g., time series) is processed by a multi-scale coarse -graining method with different time windows ω and time-delay δ to generate an ensemble of multi-scale representations of X 602 (represented by reference element 110 in the flow diagram of FIG. 1). The technique can be utilized by the value of information computations of the non-myopic value of information module (FIG. 1, 104) or used directly by other decision support modules. In one aspect, the present invention adopted permutation entropy (see Literature Reference No. 3) and symbolic transfer entropy (see Literature Reference No. 15) to robustly transform all spatiotemporal time series into symbolic series. The present invention then applies systematic coarse-graining methodology to generate multi-scale transfer entropy for pattern detection (FIG. 1, local information dynamics module 100) or for value of information computation (FIG. 1, non-myopic value of information module 104).

Permutation entropy, proposed in Literature Reference Nos. 1 and 3, compares the neighboring points of a data value to arrive at a symbol sequence (FIG. 6, 604) of time series (FIG. 6, 600) without model assumption. The method is fast, robust, and invariant to nonlinear monotonous transformation. The key idea is to slide a time window ω 606, also known as an embedding dimension, over the time series 600 to order the neighboring points according to their relative values, and then use the index of their orders to derive the symbol sequences. As a non-limiting example, given a time series with value X=(4, 7, 9, 10, 6, 11, 3) four pairs with values $x_i < x_{i+1}$ (denoted by symbol 01) and two pairs with $x_i > x_{i+1}$ (denoted by symbol 10), are used to derive the symbolic series for X as $X^5$=(01, 01, 01, 10, 01, 10). For instance, 4 is less than 7, 7 is less than 9, 9 is less than 10, and 6 is less than 11, resulting in representation of these pairs by the symbol 01. Furthermore, for the other pairs, 10 is greater than 6 and 11 is greater than 3, resulting in representation by the symbol 10 in the symbolic series. Symbolic transfer entropy essentially computes transfer entropy over transformed symbolic time series (see Literature Reference Nos. 10, 15, 16).

To automatically identify the appropriate embedding dimension and time -delay parameters is a challenging problem, as the value ranges of these parameters can be quite wide and heterogeneous. In other words, the data generation mechanisms can have diverse scales of dynamics which cannot be extracted by one single embedding dimension or one single time-delay parameter from all data sources, thus requiring multi-scale course-graining.

To derive multi-scale coarse-graining of spatiotemporal data, in one aspect, the present invention systematically generates ensembles of symbolic sequences (FIG. 6, 604) by adjusting embedding dimension, ω (FIG. 6, 606), and time-delay, δ (FIG. 6, 608), parameters to extract data points from the time series (FIG. 6, 600) and construct the pairs with the length of the embedding dimension. For instance, consider time series X=(4, 7, 9, 10, 6, 11, 3) with δ=2 and ω=2, there are five pairs ((4,9), (7,10), (9,6), (10,11), (6,3)), which is converted into symbolic series $X^5$=(01, 01, 10, 01, 10). Heuristic search algorithms are used over the ranges of embedding dimensions and time-delay parameters to derive a coarse-graining representation that optimizes the quantity of interests. For example, one may optimize the transfer entropy $T_{Y \to X}$ with respect to embedding dimension $\omega_X$, $\omega_Y$, $\delta_X$, and $\delta_Y$ as max $(\omega_X, \omega_Y, \delta_X, \delta_Y)$ $T_{Y \to X}$. Moreover, the ensembles of well-performed embedding dimensions and time-delay parameters are kept rather than simply picking the best-fit. This ensemble method will derive heterogeneous multi-scale representation, and also help in heuristic search over parameter spaces, when computing the quantity interest for newly acquired data points.

Figure 7:
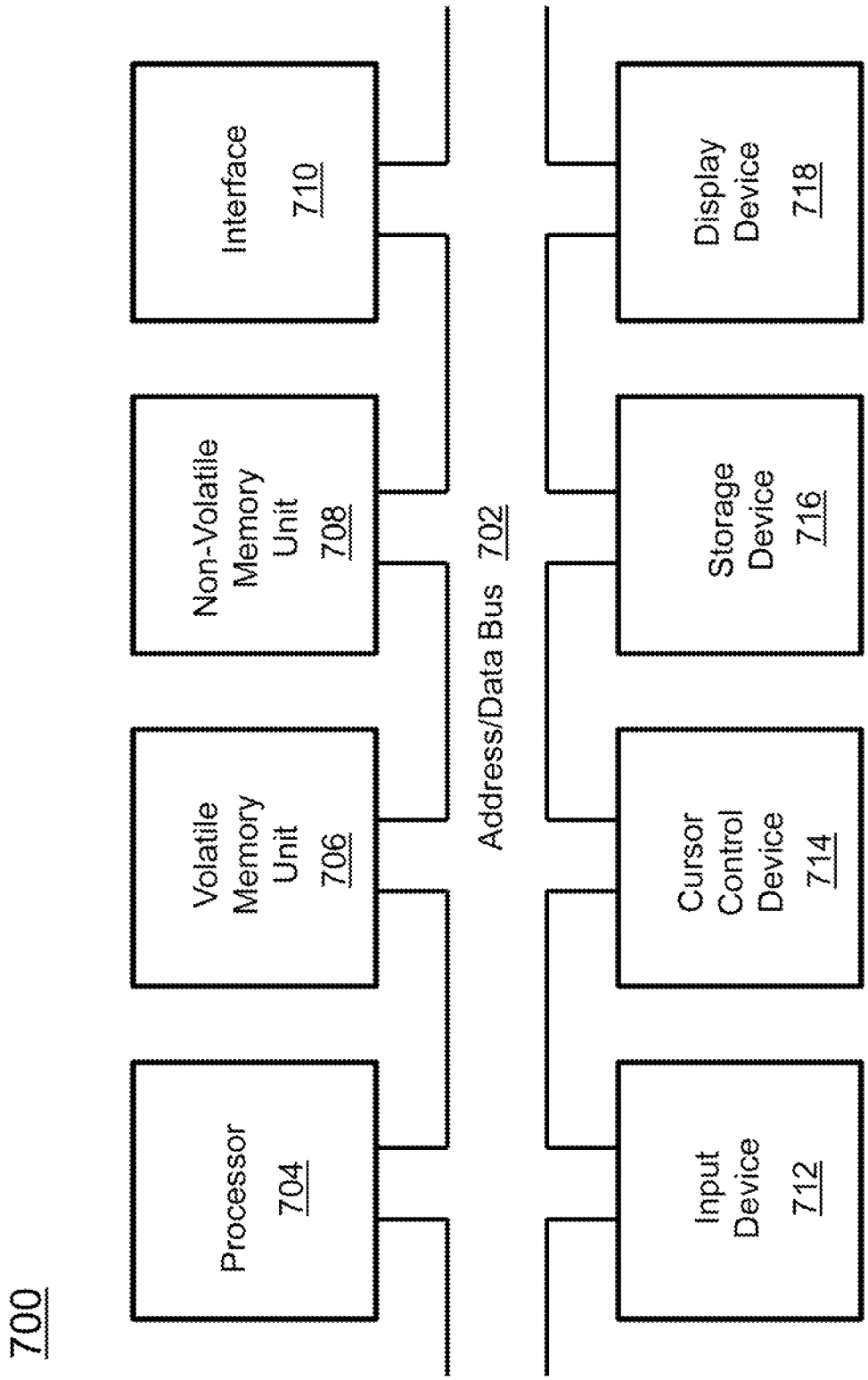
FIG. 7 is an illustration of a data processing system according to principles of the present invention.

An example of a computer system 700 in accordance with one aspect is shown in FIG. 7. The computer system 700 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 700. When executed, the instructions cause the computer system 700 to perform specific actions and exhibit specific behavior, such as described herein.

The computer system 700 may include an address/data bus 702 that is configured to communicate information. Additionally, one or more data processing units, such as a processor 704, are coupled with the address/data bus 702. The processor 704 is configured to process information and instructions. In one aspect, the processor 704 is a microprocessor. Alternatively, the processor 704 may be a different type of processor such as a parallel processor, or a field programmable gate array.

The computer system 700 is configured to utilize one or more data storage units. The computer system 700 may include a volatile memory unit 706 (e.g., random access memory ("RAM"), static RAM, dynamic RAM, etc.) coupled with the address/data bus 702, wherein a volatile memory unit 706 is configured to store information and instructions for the processor 704. The computer system 700 further may include a non-volatile memory unit 708 (e.g., read-only memory ("ROM"), programmable ROM ("PROM"), erasable programmable ROM ("EPROM"), electrically erasable programmable ROM "EEPROM"), flash memory, etc.) coupled with the address/data bus 702, wherein the non-volatile memory unit 708 is configured to store static information and instructions for the processor 704. Alternatively, the computer system 700 may execute instructions retrieved from an online data storage unit such as in "Cloud" computing. In an embodiment, the computer system 700 also may include one or more interfaces, such as an interface 710, coupled with the address/data bus 702. The one or more interfaces are configured to enable the computer system 700 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 700 may include an input device 712 coupled with the address/data bus 702, wherein the input device 712 is configured to communicate information and command selections to the processor 700. In accordance with one aspect, the input device 712 is an alphanumeric input device, such as a keyboard, that may include alphanumeric and/or function keys. Alternatively, the input device 712 may be an input device other than an alphanumeric input device. In one aspect, the computer system 700 may include a cursor control device 714 coupled with the address/data bus 702, wherein the cursor control device 714 is configured to communicate user input information and/or command selections to the processor 700. In one aspect, the cursor control device 714 is implemented using a device such as a mouse, a track-ball, a track -pad, an optical tracking device, or a touch screen. The foregoing notwithstanding, in one aspect, the cursor control device 714 is directed and/or activated via input from the input device 712, such as in response to the use of special keys and key sequence commands associated with the input device 712. In an alternative aspect, the cursor control device 714 is configured to be directed or guided by voice commands.

In one aspect, the computer system 700 further may include one or more optional computer usable data storage devices, such as a storage device 716, coupled with the address/data bus 702. The storage device 716 is configured to store information and/or computer executable instructions. In one aspect, the storage device 716 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 718 is coupled with the address/data bus 702, wherein the display device 718 is configured to display video and/or graphics. In one aspect, the display device 718 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 700 presented herein is an example computing environment in accordance with one aspect. However, the non-limiting example of the computer system 700 is not strictly limited to being a computer system. For example, one aspect provides that the computer system 700 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory -storage devices.

Figure 8:
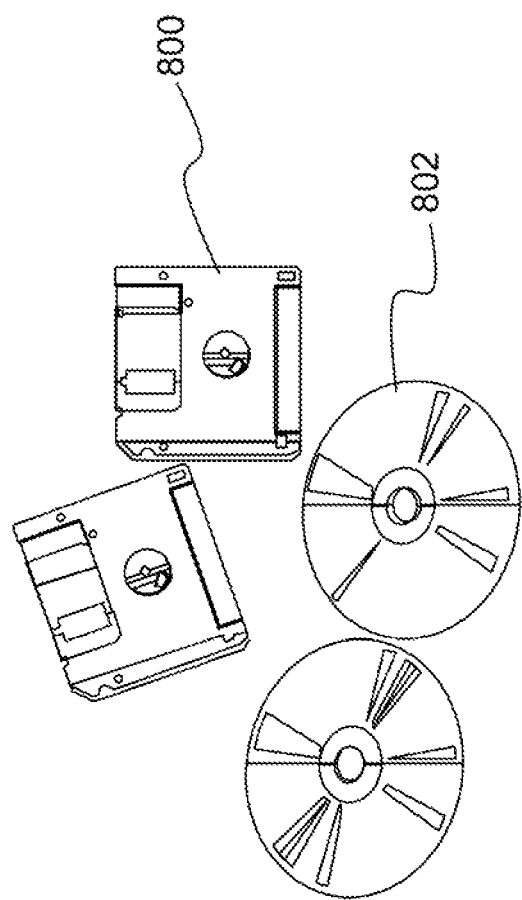
FIG. 8 is an illustration of a computer program product according to principles of the present invention.

An illustrative diagram of a computer program product embodying the present invention is depicted in FIG. 8. As a non-limiting example, the computer program product is depicted as either a floppy disk 800 or an optical disk 802. However, as mentioned previously, the computer program product generally represents computer readable code (i.e., instruction means or instructions) stored on any compatible non-transitory computer readable medium.

What is claimed is:

1. A system for automated discovery of unknown patterns from multiple heterogeneous sensors and determining value of new data acquisitions, the system comprising:
one or more processors and a non-transitory memory having instructions encoded thereon such that when the instructions are executed, the one or more processors perform operations of:
processing input data from a plurality of surveillance sensors associated with a plurality of unmanned aerial vehicles with a coarse-graining module, wherein the input data is processed with a plurality of time windows and time delays to generate multi-scale symbolic representations of the input data having various levels of granularity;
discovering and extracting previously unknown patterns in the multi-scale symbolic representations with a local information dynamics module;
determining, for each data point in time or for each surveillance sensor, a value of acquiring new input data at a next data point in time or from a new surveillance sensor with a non-myopic value of information module, resulting in a plurality of values of acquiring new input data;
generating a ranking of the plurality of values of acquiring new input data with the non-myopic value of information module; and
using the ranking, selecting at least one of the plurality of surveillance sensors associated with an unmanned aerial vehicle from which to collect new input data.

2. The system as set forth in claim 1, wherein if the input data contains missing data, then the one or more processors further perform an operation of computing values for the missing data with an effective information transfer module.

3. The system as set forth in claim 2, wherein the one or more processors further perform an operation of further utilizing the previously unknown patterns as at least one of input to the effective information transfer module to improve future missing data computations and input to the non-myopic value of information module.

4. The system as set forth in claim 2, wherein the one or more processors further perform an operation of substituting missing data with estimated values with the effective information transfer module, wherein effective information transfer is used to compute the estimated values.

5. The system as set forth in claim 1, wherein the one or more processors further perform an operation of adjusting, with the coarse-graining module, an embedding dimension parameter and a time-delay parameter to extract data points from the input data in order to generate the multi-scale symbolic representations.

6. The system as set forth in claim 1, wherein the one or more processors further perform an operation of using at least one of a local transfer entropy measure and a local action information storage measure to discover and extract the previously unknown patterns with the local information dynamics module.

7. The system as set forth in claim 1, wherein the one or more processors further perform operations of:
using transfer entropy as a quasi-utility value function;
computing an expected value of observing new input data;
computing expected benefits of observing new input data; and
computing a value of information of observing new input data, wherein the value of information is computed by weighting the expected benefit of observing new input data against a cost of observing the new input data.

8. The system as set forth in claim 1, wherein the input data is streaming data from a surveillance sensor.

9. A computer-implemented method for automated discovery of unknown patterns from multiple heterogeneous sensors and determining value of new data acquisitions, comprising:
an act of causing a data processor to execute instructions stored on a non-transitory memory such that upon execution, the data processor performs operations of:
processing input data from a plurality of surveillance sensors associated with a plurality of unmanned aerial vehicles with a coarse-graining module, wherein the input data is processed with a plurality of time windows and time delays to generate multi-scale symbolic representations of the input data having various levels of granularity;
discovering and extracting previously unknown patterns in the multi-scale symbolic representations with a local information dynamics module;
determining, for each data point in time or for each surveillance sensor, a value of acquiring new input data at a next data point in time or from a new surveillance sensor with a non-myopic value of information module, resulting in a plurality of values of acquiring new input data;
generating a ranking of the plurality of values of acquiring new input data with the non-myopic value of information module; and
using the ranking, selecting at least one of the plurality of surveillance sensors associated with an unmanned aerial vehicle from which to collect new input data.

10. The method as set forth in claim 9, wherein if the input data contains missing data, then the data processor further performs an operation of computing values for the missing data with an effective information transfer module.

11. The method as set forth in claim 10, wherein the data processor further performs an operation of further utilizing the previously unknown patterns as at least one of input to the effective information transfer module to improve future missing data computations and input to the non-myopic value of information module.

12. The method as set forth in claim 10, wherein the data processor further performs an operation of substituting missing data with estimated values with the effective information transfer module, wherein effective information transfer is used to compute the estimated values.

13. The method as set forth in claim 9, wherein the data processor further performs an operation of adjusting, with the coarse-graining module, an embedding dimension parameter and a time-delay parameter to extract data points from the input data in order to generate the multi-scale symbolic representations.

14. The method as set forth in claim 9, wherein the data processor further performs an operation of using at least one of a local transfer entropy measure and a local action information storage measure to discover and extract the previously unknown patterns with the local information dynamics module.

15. The method as set forth in claim 9, wherein the data processor further performs operations of:
using transfer entropy as a quasi-utility value function;
computing an expected value of observing new input data;
computing, expected benefits of observing, new input data; and
computing a value of information of observing new input data, wherein the value of information is computed by weighting the expected benefit of observing new input data against a cost of observing the new input data.

16. A computer program product for automated discovery of unknown patterns from multiple heterogeneous sensors and determining value of new data acquisitions, the computer program product comprising computer-readable instructions stored on a non-transitory computer-readable medium that are executable by a computer having a processor for causing the processor to perform operations of:
processing input data from a plurality of surveillance sensors associated with a plurality of unmanned aerial vehicles with a coarse-graining module, wherein the input data is processed with a plurality of time windows and time delays to generate multi-scale symbolic representations of the input data having various levels of granularity;
discovering and extracting previously unknown patterns in the multi-scale symbolic representations with a local information dynamics module;
determining, for each data point in time or for each surveillance sensor, a value of acquiring new input data at a next data point in time or from a new surveillance sensor with a non-myopic value of information module, resulting in a plurality of values of acquiring new input data;
generating a ranking of the plurality of values of acquiring new input data with the non-myopic value of information module; and
using the ranking, selecting at least one of the plurality of surveillance sensors associated with an unmanned aerial vehicle from which to collect new input data.

17. The computer program product as set forth in claim 16, wherein if the input data contains missing data, then the computer program product further comprises instructions for causing the processor to perform an operation of computing values for the missing data with an effective information transfer module if the input data contains missing data.

18. The computer program product as set forth in claim 17, further comprising instructions for causing the processor to perform an operation of further utilizing the previously unknown patterns as at least one of input to the effective information transfer module to improve future missing data computations and input to the non-myopic value of information module.

19. The computer program product as set forth in claim 17, further comprising instructions for causing the processor to perform an operation of substituting missing data with estimated values with the effective information transfer module, wherein effective information transfer is used to compute the estimated values.

20. The computer program product as set forth in claim 16, further comprising instructions for causing the processor to perform an operation of adjusting, with the coarse-graining module, an embedding dimension parameter and a time-delay parameter to extract data points from the input data in order to generate the multi-scale symbolic representations.

21. The computer program product as set forth in claim 16, further comprising instructions for causing the processor to perform an operation of using at least one of a local transfer entropy measure and a local action information storage measure to discover and extract the previously unknown patterns with the local information dynamics module.

22. The computer program product as set forth in claim 16, further comprising instructions for causing the processor to perform operations of:
  using transfer entropy as a quasi-utility value function;
  computing an expected value of observing new input data;
  computing expected benefits of observing new input data; and
  computing a value of information of observing new input data, wherein the value of information is computed by weighting the expected benefit of observing new input data against a cost of observing the new input data.

* * * * *